United States Patent Office 3,535,402
Patented Oct. 20, 1970

3,535,402
DEHYDROGENATION OVER Pt-Re CATALYST
Harris E. Kluksdahl, San Rafael, Calif., assignor to Chevron Research Company, San Francisco, Calif., a corporation of Delaware
No Drawing. Continuation-in-part of application Ser. No. 639,719, May 19, 1967, which is a continuation-in-part of application Ser. No. 560,166, June 21, 1966. This application Aug. 19, 1968, Ser. No. 753,698
Int. Cl. B01j 11/08; C07c 3/28, 5/18
U.S. Cl. 260—683.3       9 Claims

ABSTRACT OF THE DISCLOSURE $C_3$–$C_5$ paraffins are dehydrogenated by contacting the paraffins with the catalyst comprising 0.01 to 3 weight percent platinum and 0.01 to 5 weight percent rhenium associated with a nonacidic porous solid carrier at dehydrogenation conditions including a temperature of from 900 to 1100° F. and a pressure of from 3 p.s.i.a. to 100 p.s.i.a.

CROSS-REFERENCE

This application is a continuation-in-part of application Ser. No. 639,719, filed May 19, 1967 (now Pat. 3,415,737 issued Dec. 10, 1968), which is in turn a continuation-in-part of application Ser. No. 560,166, filed June 21, 1966, now abandoned.

BACKGROUND OF THE INVENTION

Field

The present invention relates to the conversion of $C_3$–$C_5$ paraffins to olefins. More particularly, the present invention relates to the conversion of butanes, particularly isobutane, to butenes in a catalytic dehydrogenation process using a catalyst comprising platinum and rhenium supported on a nonacidic porous solid carrier.

Prior art

It is generally important in dehydrogenation processes to obtain high conversion of the paraffins to olefins without undesirable side reactions, for example, cracking, isomerization, or dehydrocyclization. Moreover, it is desirable to have a process which can operate for long onstream periods of time before catalyst regeneration is necessary. Thus, the dehydrogenation catalyst should possess high activity and selectivity while exhibiting high temperature stability in the dehydrogenation process. Typical catalysts useful in the dehydrogenation of paraffins comprise platinum in association with porous carriers, for example, alumina.

SUMMARY OF THE INVENTION

It has now been discovered that low-boiling paraffins, that is, paraffins boiling within the range of $C_3$–$C_5$, and preferably normal butane and isobutane, can be converted to olefins, e.g., monoolefins and/or diolefins, at high conversion rates and without increased fouling or decreased yield stability of the catalyst by using as the catalyst a composite comprising platinum and rhenium in association with a nonacidic porous solid carrier.

Thus, the process of the present invention comprises converting $C_3$–$C_5$ paraffins to olefins by dehydrogenating said paraffins at reaction conditions including a temperature of from about 900 to 1100° F., and a pressure of from about 3 to 100 p.s.i.a., with a catalyst comprising 0.01 to 3 weight percent platinum and from 0.01 to 5 weight percent rhenium associated with a nonacidic porous solid carrier. Preferably, the paraffins are butanes and, more preferably, isobutane.

DESCRIPTION OF THE INVENTION

The vapor phase dehydrogenation process of the present invention is conducted at dehydrogenation conditions including a temperature of from 900 to 1100° F. and preferably from 900 to 1050° F. The pressure in the reaction zone is preferably from 3 p.s.i.a. to 100 p.s.i.a. and more preferably from 3 p.s.i.a. to 65 p.s.i.a. High temperatures are necessary in order to maintain substantial conversion of the paraffins to olefins. However, excessive temperatures, that is, above 1100° F., result in a high degree of thermal and catalytic cracking which not only results in production of undesirable light gases but also leads to rapid catalyst deactivation as a result of deposition of carbonaceous materials. The liquid hourly space velocity (LHSV) is preferably within the range of 0.5 to 5. If molecular hydrogen is added, the hydrogen to hydrocarbon mole ratio is preferably within the range from 1 to 5 although higher ratios, for example, up to 10, may be employed. Preferably, if molecular hydrogen is added, the hydrogen to hydrocarbon mole ratio is from 2 to 4. At the low pressures, that is, at subatmospheric conditions, hydrogen need not be added to the reaction zone.

The feed used in the present invention comprises paraffinic hydrocarbons of from 3 to 5 carbon atoms per molecule. Preferably the feeds are essentially free of sulfur, i.e., contain less than about 10 p.p.m. sulfur to feed, by weight. The preferred paraffin feeds are branched chained paraffins, that is, isobutane and isopentane. However, any of the $C_3$–$C_5$ paraffins can be dehydrogenated in accordance with the present invention. The preferred feed for present inventive purposes is butane. Preferably isobutane is used as the feed; isobutene has wide application in the polymer field. Preferably, the butane or isobutane feed will be essentially free of other hydrocarbons, e.g., 90 volume percent butane or isobutane.

The catalyst carrier useful for purposes of the present invention should be a nonacidic porous solid carrier support. The term "nonacidic" is intended to preclude the use of halogen components and those inorganic oxides which possess the acidic function characteristic of material which actively promotes cracking reactions. By "porous" is meant that the support has a high surface area, for example, a surface area of from 50 to 700 m.$^2$/gm., and preferably, a surface area of 150 to 700 m.$^2$/gm. The carriers which can be used include a wide variety of materials. Preferably, the porous nonacidic solid carrier is an inorganic oxide. The carrier can be a natural or synthetically produced inorganic oxide or a combination of inorganic oxides. Thus, for example, inorganic oxide supports which can be used are the natural and synthetically produced aluminum silicates and the synthetically produced supports such as silica, zirconia, magnesia, alumina, silica-alumina, silica-zirconia, etc. Supports which inherently have acidic sites which promote cracking reactions must have their acidic sites completely neutralized in order to produce the desirable nonacidic inorganic oxide carrier.

Alumina is a particularly preferred carrier for purposes of this invention. Any of the forms of alumina suitable as supports for dehydrogenation reactions can be used. Thus, the alumina can be any of a variety of activated aluminas or alumina hydrates. Alumina can be prepared by a variety of methods for purposes of this invention. Such methods of preparation are well known in the prior art.

The carrier of the present invention preferably has disposed thereon an alkali or alkaline earth material, for example, lithium, sodium, potassium, rubidium, cesium, calcium, magnesium, etc. Preferably, the carrier has associated therewith an alkali metal, particlarly lithium. Sufficient alkali or alkaline earth metal or other neutralizing material should be present to completely neutralize the acid sites of the carrier plus any other inherent acidity possessed by the dehydrogenating metals, for example, platinum and rhenium. Generally, the alkali and alkaline earth metals are present in an amount, calculated as the metal, of from 0.1 to 20 weight percent based on the finished catalyst and preferably from 0.1 to 10 weight percent. The carrier can also be neutralized by contacting it with an ammonia-containing solution or gas. Regardless of the method of neutralizing the acid sites of the carrier and/or of the metals associated with the carrier, for example, platinum, the carrier should remain effectively neutralized throughout the dehydrogenation process. Neutralization of acid sites is preferred even in the case of the relatively nonacidic carriers, for example, alumina. Such carriers, although considered to be nonacidic, possess a limited amount of acidity which is not desirable for purposes of the present invention. Furthermore, as indicated previously, platinum possesses a certain inherent acid function which it is desirable to counteract.

The catalyst proposed for use in the present invention preferably comprises platinum in an amount from 0.01 to 3 weight percent and more preferably from 0.2 to 1 weight percent based on the finished catalyst. Concentrations of platinum below about 0.01 weight percent are too low for satisfactory dehydrogenation; on the other hand, concentrations of platinum above 3 weight percent produce excessive cracking. Furthermore, due to the high cost of platinum, the amount used is somewhat restricted. Concentration of rhenium in the finished catalyst composition is preferably from 0.01 to 5 weight percent and more preferably from 0.1 to 2 weight percent based on the finished catalyst.

Although platinum and rhenium can be intimately associated with the nonacidic porous solid carrier by suitable techniques such as by ion-exchange, coprecipitation, etc., the metals are usually associated with the nonacidic porous solid carrier by impregnation. Furthermore, one of the metals can be associated with the carrier by one procedure, e.g., ion-exchange, and the other metal associated with the carrier by another procedure, e.g., impregnation. As indicated, however, the metals are preferably associated with the carrier by impregnation. The catalyst can be prepared either by coimpregnation of the two metals or by sequential impregnation. In general, the carrier material is impregnated with an aqueous solution of a decomposable compound of the metal in sufficient concentration to provide the desired quantity of metal in the finished catalyst; the resulting mixture is then heated to remove water. Chloroplatinic acid is generally the preferred source of platinum. Other feasible platinum-containing compounds, e.g., ammonium chloroplatinates and polyamineplatinum salts, can also be used. Rhenium compounds suitable for incorporation onto the carrier include, among others, perrhenic acid and ammonium or potassium perrhenates. It is contemplated in the present invention that incorporation of the metals with the carrier can be accomplished at any particular stage of the catalyst preparation. For example, if the metals are to be incorporated onto an alumina support, the incorporation may take place while the alumina is in the sol or gel form followed by precipitation of the alumina. Alternatively, a previously prepared alumina carrier can be impregnated with a water solution of the metal compounds. Regardless of the method of preparation of the supported platinum-rhenium catalyst it is desired that the platinum and rhenium be in intimate association with each other.

If alkali or alkaline earth metal components are associated with the catalyst, such components are preferably impregnated onto the carrier. However, alkali or alkaline earth metal components can also be associated with the carrier by cogelation or coimpregnation or other known methods. It is preferred to incirporate the dehyrdogenation metals, platinum and rhenium, onto the carrier after adding the alkali or alkaline earth metals. Preferred impregnating alkali or alkaline earth compounds are those that decompose during calcination to give most likely the corresponding metal aluminate after intermediate oxide formation. Thus, preferred alkali or alkaline earth compounds include the alcoholates, chelate, hydroxides, carbonates, bicarbonates, etc.

Following incorporation of the carrier material with platinum and rhenium, and if it is desired to have alkali or alkaline earth metals present, following incorporation of the compounds of same, the resulting composite is dried by heating, for example, at a temperature of no greater than 500° F. and preferably from 200 to 400° F. and then calcined at an elevated temperature of up to 1200° F. if desired. Calcination temperatures are preferably from 600 to 1200° F. and more preferably from 600 to 1000° F. If desired, the catalyst can be calcined prior to incorporation of the neutralizing alkali or alkaline earth metals, then calcined again following incorporation of the neutralizing metals.

The catalyst containing the dehydrogenation components, platinum and rhenium, is preferably subjected to a reducing atmosphere at an elevated temperature prior to use in dehydrogenation reactions. The prereduction is preferably performed in the presence of hydrogen, and more preferably dry hydrogen. It is preferred that the prereduction be accomplished at a temperature in the range of from 600 to 1100° F. and preferably 600 to 1000° F.

The catalyst can be sulfided prior to the dehydrogenation process. Preferably, however, the catalyst exists during the dehydrogenation process with the platinum and rhenium in the metallic state. Sulfiding of the catalyst to convert the metals to the sulfided form prior to or during the initial stages of the dehydrogenation process is generally done in order to reduce the initial hydrocracking activity of the catalyst. During the process, however, the catalyst is stripped of sulfur and the metals, platinum and rhenium, converted to the metallic state. Sulfur addition throughout the dehydrogenation process, which would be necessary in order to maintain the metals in the sulfided form, is generally not satisfactory for purposes of the present invention.

After a period of operation when the catalyst becomes deactivated by the presence of carbonaceous deposits, the catalyst can be reactivated or regenerated by passing an oxygen-containing gas, such as air, into contact with the catalyst at an elevated temperature in order to burn carbonaceous deposits from the catalyst. The method of regenerating the catalyst will depend on whether there is a fixed bed, moving bed, or fluidized bed operation. Regeneration methods and conditions are well known in the art.

The process of the present invention will be more readily understood by reference to the following example.

*Example.*—A catalyst comprising platinum and rhenium was compared with a catalyst comprising platinum without rhenium for the dehydrogenation of isobutane. The catalyst comprising platinum without rhenium consited of 0.5 weight percent platinum and 0.5 weight percent lithium associated with alumina extrudate. The platinum catalyst without rhenium is hereinafter referred to as Catalyst A. The catalyst was soaked in distilled water for 15 minutes, then heated for one hour at 300° F. in air and for one hour at 600° F. in air, and finally calcined for one hour at 1000° F. in air. The catalyst was then reduced at 900° F in flowing hydrogen at one atmosphere for one hour.

The catalyst comprising platinum and rhenium was prepared by subjecting Catalyst A to an aqueous pore-fill impregnation with aqueous perrhenic acid solution calculated (from water pore volume measurement) to provide 0.5 weight percent rhenium on the calcined catalyst. The platinum-rhenium catalyst is hereinafter referred to as Catalyst B. Catalyst B was then subjected to the same heat treatment and hydrogen reduction as Catalyst A. Neither Catalyst A nor B was sulfided prior to use in the dehydrogenation process.

The two catalysts were tested for isobutane dehydrogenation at a pressure of one atmosphere, a temperature of 900° F. and a liquid hourly space velocity of 1.0. No added hydrogen was used. The feed consisted of 100 percent isobutane. The results are tabulated in the following table.

TABLE

| Catalyst | Run time, hrs. | i-Butene yield, wt. percent | Coke, wt. percent |
|---|---|---|---|
| A (Pt) | 0.25 | 18.7 | |
| | 1.50 | 15.5 | |
| | 3.25 | 11.6 | |
| | 5.00 | 7.6 | 3.7 |
| B (Pt+Re) | 0.25 | 20.0 | |
| | 1.50 | 19.8 | |
| | 3.00 | 18.5 | |
| | 5.00 | 17.9 | 3.3 |

As can be seen by the data in the table, the catalyst comprising platinum and rhenium (Catalyst B) is far superior to the catalyst comprising platinum without rhenium (Catalyst A). The dehydrogenation process with Catalyst B resulted in a higher production level of isobutene, without a resulting increase in the coke product, compared to the dehydrogenation process using Catalyst A. Furthermore, the yield stability of Catalyst B was significantly better than that of Catalyst A during the dehydrogenation process. For example, the isobutene yield using Catalyst B decreased from 20 weight percent to only 17.9 weight percent during the five-hour onstream time, whereas the isobutene yield using Catalyst A decreased from 18.7 weight percent to 7.6 weight percent, a decrease of about two-and-one-half. The process of the present invention unexpectedly permits an isobutane dehydrogenation process to be conducted with (a) higher initial conversion to isobutene, (b) a lower yield decline of isobutene throughout the run, and (c) a lower fouling rate of the catalyst at the high conversion rates.

The foregoing disclosure of this invention is not to be considered as limiting since many variations can be made by those skilled in the art without departing from the scope or spirit of the appended claims.

I claim:

1. A process for converting $C_3$–$C_5$ paraffins to olefins which comprises contacting said paraffins at dehydrogenation conditions including a temperature of from 900° F. to 1100° F., and a pressure of from 3 p.s.i.a. to 100 p.s.i.a., with a catalyst comprising 0.01 to 3 weight percent platinum and from 0.01 to 5 weight percent rhenium associated with a nonacidic porous solid carrier.

2. The process of claim 1 wherein said paraffins consist essentially of butane.

3. The process of claim 2 wherein said butane is essentially isobutane.

4. The process of claim 1 wherein said nonacidic porous solid carrier is free of halogen.

5. The process of claim 1 wherein said nonacidic porous solid carrier is an inorganic oxide.

6. The process of claim 1 wherein said carrier contains from 0.1 to 10 weight percent of a metal selected from the class consisting of alkali metal and alkaline earth metals.

7. The process of claim 1 wherein said dehydrogenation process is conducted in the presence of hydrogen in an amount from 1 to 5 moles of hydrogen per mole of feed.

8. A process for the dehydrogenation of isobutane to isobutene which comprises contacting said isobutane at a temperature of from about 900° F. to 1100° F. and a pressure of from 3 p.s.i.a. to 65 p.s.i.a., with a catalyst comprising 0.01 to 3 weight percent platinum and 0.01 to 5 weight percent rhenium and 0.1 to 10 weight percent of an alkali metal associated with a nonacidic porous alumina carrier.

9. The process of claim 8 wherein said alkali metal is lithium.

References Cited

UNITED STATES PATENTS 3,236,765  2/1966  Erbelding _____ 208—254
3,296,118  1/1967  Czajkowski et al. ____ 208—138

OTHER REFERENCES

Blom et al.: I & E Chem. 54 (4), 16–22 (April 1962).
Blom et al.: Hydrocarbon Processing 42 (10), 132–134 (1963).
Muller et al.: Z. Chem. 5 (8), 313–314 (1965).

DELBERT E. GANTZ, Primary Examiner

G. E. SCHMITKONS, Assistant Examiner

U.S. Cl. X.R.

252—466, 474

PO-1050
(5/69)

UNITED STATES PATENT OFFICE
CERTIFICATE OF CORRECTION

Patent No. 3,535,402       Dated October 20, 1970

Inventor(s) HARRIS E. KLUKSDAHL

It is certified that error appears in the above-identified patent and that said Letters Patent are hereby corrected as shown below:

Col. 3, line 53, "polyamineplatinum" should read --polyammineplatinum--.

Signed and sealed this 5th day of December 1972.

(SEAL)
Attest:

EDWARD M. FLETCHER, JR.
Attesting Officer

ROBERT GOTTSCHALK
Commissioner of Patents